Dec. 22, 1959    R. W. PAGE    2,917,829
DRILLING INSTRUMENT
Filed Feb. 24, 1958    3 Sheets—Sheet 1
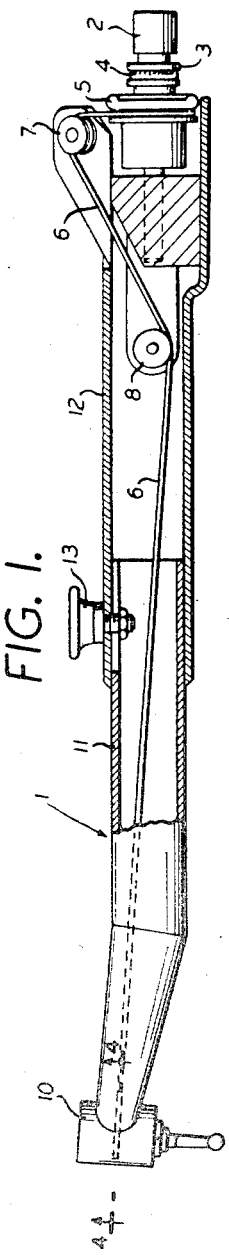
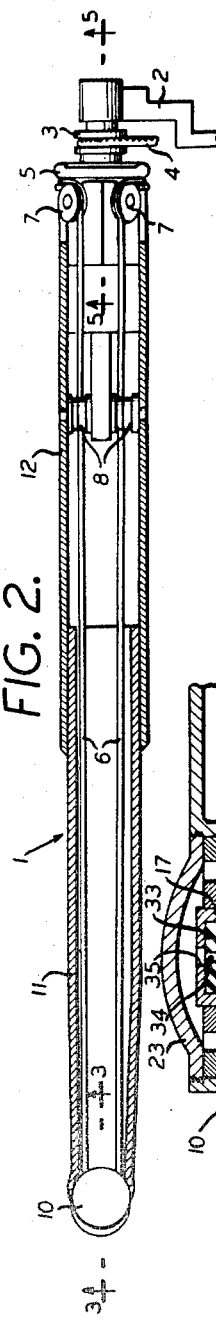
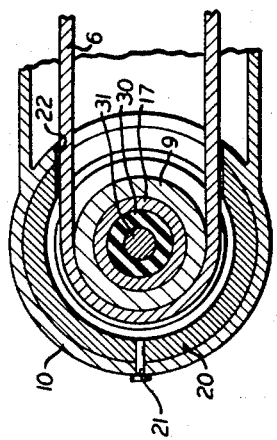
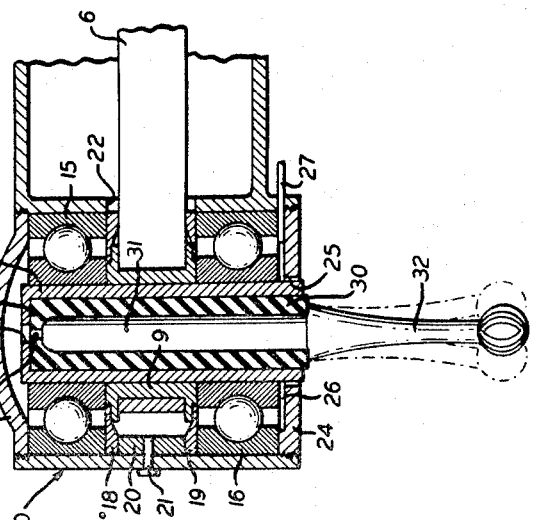
INVENTOR.
Richard W. Page
BY Dec. 22, 1959  R. W. PAGE  2,917,829
DRILLING INSTRUMENT
Filed Feb. 24, 1958  3 Sheets—Sheet 2
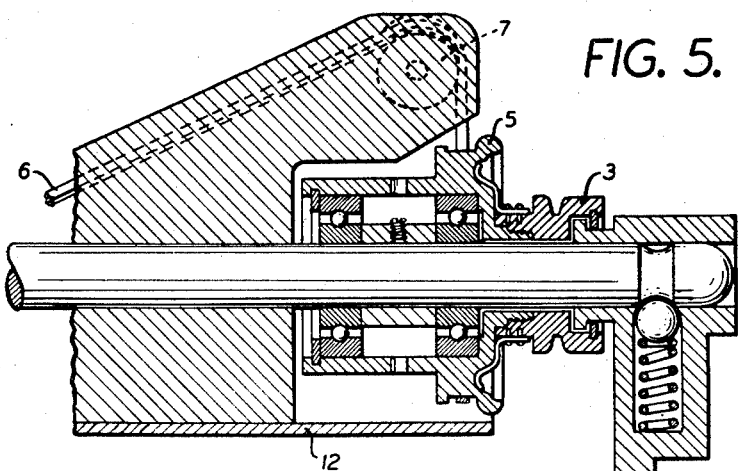
FIG. 5.
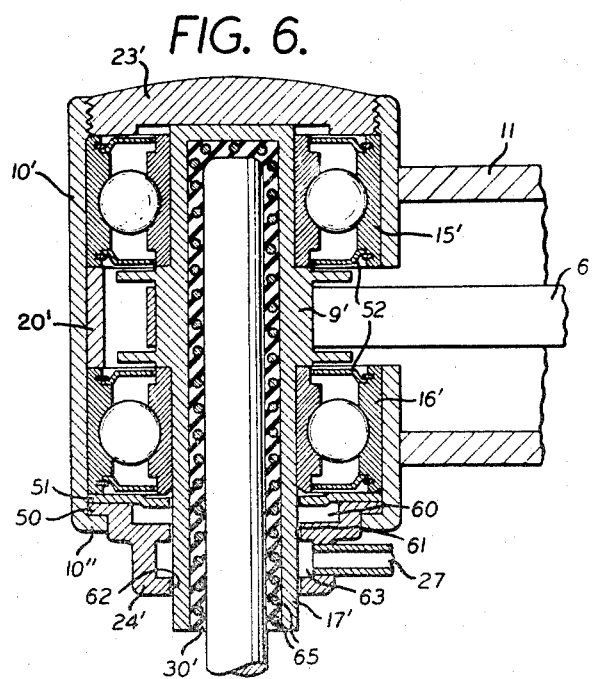
FIG. 6.
FIG. 7.
FIG. 8.
FIG. 9.
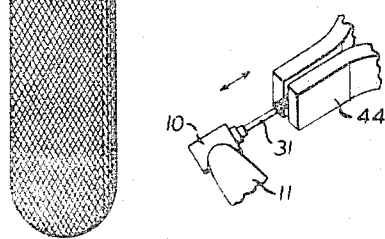
INVENTOR.
Richard W. Page
BY Dec. 22, 1959  R. W. PAGE  2,917,829
DRILLING INSTRUMENT
Filed Feb. 24, 1958  3 Sheets-Sheet 3

INVENTOR
RICHARD W. PAGE
BY
ATTORNEY

United States Patent Office 2,917,829
Patented Dec. 22, 1959

2,917,829

DRILLING INSTRUMENT

Richard W. Page, Chappaqua, N.Y., assignor to Chayes Dental Instrument Corporation, Danbury, Conn., a corporation of New York Application February 24, 1958, Serial No. 717,087

3 Claims. (Cl. 32—27)

This invention relates to drilling instruments, and more particularly to dental drills and to the drill holding elements or chucks thereof.

It is an object of the invention to provide an improved chuck for holding a dental drilling burr.

Another object of the invention is to provide an improved seal for a drilling head, which protects the bearings against the entrance of water and dental detritus.

The present application is a continuation-in-part of my previous applications, Serial No. 534,037, filed September 13, 1955 for Dental Drill, and Serial No. 677,669, filed August 12, 1957 for Drilling Instrument, and is directed particularly to the chuck drilling head and sealing features of those applications and to certain improvements thereon.

A drilling instrument embodying the invention in a preferred form will now first be described with reference to the accompanying drawing, and the features forming the invention will then be pointed out in the appended claims.

In the drawing:

Fig. 1 is a side elevation of a dental contra angle, partly broken away to show internal structure;

Fig. 2 is a plan view of the instrument of Fig. 1, also broken away to show internal structure;

Fig. 3 is an enlarged section on the line 3—3 of Fig. 2;

Fig. 4 is an enlarged section on the line 4—4 of Fig. 1;

Fig. 5 is an enlarged section on the line 5—5 of Fig. 2;

Fig. 6 is a view similar to Fig. 3, but showing a modified form of the invention;

Fig. 7 is an isometric showing the manner of inserting the chuck in the instrument drilling head;

Fig. 8 is a sectional view showing the manner of removing a chuck;

Fig. 9 is an isometric showing the manner of inserting a dental burr in the chuck;

Figure 10:
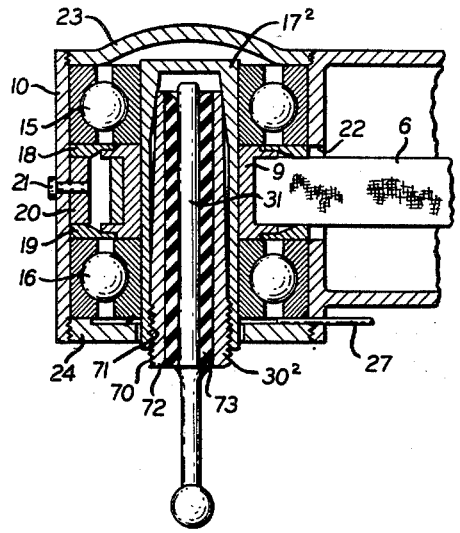
Fig. 10 is a view similar to Fig. 3, but showing a modified form of chuck.

Referring now to Figs. 1 and 2, the instrument shown is similar to that shown in the above mentioned applications, and will be described herein only to the extent necessary for a full understanding of the present invention.

The contra angle, indicated generally at 1, is pivotally attached to an end fitting 2 which attaches to the engine arm and the contra angle has a pulley 3 driven by the dental engine belt 4 concentric about the pivotal axis of the contra angle. A larger pulley 5 connected to and driven directly by pulley 3 drives the drill through a belt 6 which is guided by suitable guide pulleys 7 and 8 and passes around a driven pulley 9 located in the instrument head 10 for driving the drill. The belt and other parts generally are enclosed in a casing which may be formed in two parts 11 and 12, slidably fitting together and held in adjusted position as by means of a thumb screw 13. This adjustment permits regulating tension of the belt 6.

As will be apparent from the following description, the invention is not limited in its broader aspect to pulley drives of the type shown but is applicable generally so far as the chuck and closure features are concerned without reference to the manner in which the belt 6 may be driven. Also, as will be apparent from the following description, the chuck of the invention considered in its broader aspect is applicable also to drill drives regardless of whether the same are of the belt type or any other usual type such as gear driven, electric, pneumatic or hydraulic. The particular drive described above is in general included herein merely for completeness and to illustrate the operation of the invention in a complete manner with respect to one particular type of drive mechanism.

Referring now particularly to Figs. 3 and 4 of the drawing, it will be seen that the drilling head of the instrument comprises a generally cylindrical casing 10, within which are fitted the outer races of a pair of ball bearings 15 and 16, the inner races of which are fitted to and support the tubular shaft element 17. Between the inner races of the bearings 15, 16, there is fitted to the shaft 17 the pulley 9 previously referred to, and between the outer races of the bearings there is fitted a pair of washer elements 18, 19, together with a spacer ring 20 which is held in place within the cylindrical housing 10 by a pin 21. Spacer 20 is interrupted, as indicated in Fig. 4, to permit passage of the belt 6 and the casing 10 has an opening 22 accommodating the belt. Washers 18, 19 and the flanges of pulley 9 interfit as more fully described in the above mentioned applications to close off the bearings 15, 16 against the space between bearings, which is in communication with the interior of the casing 11, 12 through the opening 22. The outer races of bearings 15, 16 are located axially of the shaft 17 by a cap 23 and closure plate 24, as indicated. With the chuck of the invention, no opening through the cap 23 is necessary, thus permitting an exceptionally good seal for the operating parts. Shaft 17 passes through a central bore 25 in the plate 24 with operating clearance and without packing at this point. Under dental drilling operating conditions, packing at the point of emergence of the shaft is not very satisfactory in any event unless the entire interior of the drilling head can be packed with grease. In the preferred applications of the drill of the present invention, there is the additional difficulty that the friction involved in any packing and sealing gland at this point is highly objectionable, as the drill may operate at speeds up to about 150,000 r.p.m., at which speeds (and even at much lower speeds) a packing gland or sealing fit may readily develop destructive friction and heat. The sealing plate 24 engages the outer race of bearing 16 peripherally but is formed with an annular recess or depression 26 communicating with the clearance space around shaft 17 and providing an operating clearance between plate 24 and the inner race of bearing 16. Air is supplied to space 26 through tubing 27 during the operation of the drill, so as to maintain a constant outward flow of air through clearance 25, thus preventing ingress of any moisture or grit particles.

It will be observed that the tubular shaft 17, where it passes through the bore 25 is solid and is not split as is the case in most chucks to permit gripping and releasing the drill. This permits establishing once for all the precise desired clearance between bore 25 and shaft 17 so that an accurately defined and known air exhaustion passage is provided, with the maintenance of a very slight pressure in space 26, a sufficient outflow of air will be created to protect the parts against the entry of water or other foreign material.

The tubular shaft 17 contains a sleeve 30 of rubber, nylon, Teflon or any of various synthetic resin materials having suitable characteristics as to resilience and the shank 31 of the burr 32 is frictionally received and held in this resilient chuck element 30. To facilitate insertion of the resilient chuck element 30, it may be formed with a generally closed inner head 33, and this, in turn, may, in some cases, be provided with a small central opening 34 communicating with a small central opening 35 in a similarly closed end of the hollow shaft 17. In certain cases, the openings 34, 35 may be omitted, and in other cases, the resilient member 30 may be a simple tubular element without the enclosed end 33. The precise construction features adopted and particulars just referred to depend upon particular operating conditions which will be discussed in somewhat more detail below.

The resilient chuck or sleeve element 30 may be inserted, as indicated in Fig. 7, using a tool 40 consisting of a handle carrying a pin 41 slightly smaller than the burr shank 31 and fitting in the resilient sleeve element 30. Using this simple tool, the element 30 may be pushed into the hollow shaft 17, into the positon of Fig. 3, and the tool 40 may then be withdrawn, leaving the parts in condition to receive a dental drilling burr. Extraction of an element 30 for replacement is also a simple matter and involves merely the use of an element 42, similar to a crochet needle and having a barb 43. This tool may be pushed into the resilient chuck 30, engaging the barb 43 therein and then extracted, removing a worn or damaged element 30 for replacement by a new part. The insertion of a burr or removal thereof is equally simple and involves merely the gripping of the head of the burr in the jaws 44 (preferably of plastic) or suitable pair of tongs, forcing the shank 31 into the resilient chuck 30 until it bottoms therein. The shank 31 is preferably lubricated slightly, as by using a bit of soap or other convenient lubricant.

A modified and improved form of the invention is shown in Fig. 6. In this arrangement, the casing 10' is constructed much as before and terminates in an inwardly facing flange 10'', against which the end closure member 24' is seated and held in position by its periphery 50 engaging in a wall of the casing 10'. Above the member 24' is located a closure plate or washer 51, which may fit closely to the hollow shaft 17', being lapped in use so as to establish an absolute minimum operating clearance between the washer 51 and the shaft 17'. The bearings 15', 16' are similar to those previously described but are provided with their own closure elements 52. The washers 18, 19 may, accordingly, be eliminated and a spacer 20' engages directly against the outer races of the bearings to hold them in spaced relation. The upper cap 23' engages against the outer races of the bearings as before, thus locating these elements, and the pulley 9', here shown as formed integral with the hollow shaft 17', is located by the inner races of the bearings as before, thus holding the tubular shaft 17' in position within the casing.

End plate 25' has an annular recess 60 surrounding the tubular shaft 17' and adjacent the washer 51, which recess is preferably packed with grease. Below the recess 60, the element 24' is formed with a bore 61, 62 accommodating shaft 17' with the required slight clearance and has a further annular recess or chamber 63 between bore sections 61 and 62, which chamber 63 communicates with an air supply line 27, as before. Washer 51 having a relatively close fit to shaft 17' effectively prevents the flowing of grease from the space 60 into the bearings, while the air within chamber 63 provides a continuous exhaust of air between bore 62 and tubular shaft 17' while the drill is operating, thus preventing entry of water and gritty material, as before.

The resilient chuck element 30' is a modified construction, consisting of a tubular structure of wire screen 65 which is molded into rubber or other plastic, filling the space between the screen wires and furnishing relatively smooth inner and outer surfaces for engaging the burr shank 31' and inner walls of the tubular shaft 17', respectively. The provision of a screen wire stiffens the element 30' in the axial direction sufficiently to permit ready insertion of the chuck and burr shank while at the same time preserving resiliency in the radial direction, to the extent necessary for holding the parts in position. The amount, type and location of reinforcement of the resilient chuck element may be varied, as also the manner of insertion into the instrument, and where material of sufficient stiffness is utilized, reinforcing elements will not be necessary.

A modified form of chuck is shown in Fig. 10. In this case, the chuck element $30^2$ is externally threaded as indicated at 70 and screws into a correspondingly threaded section 71 of the center bore of the tubular shaft element $17^2$. The remaining parts may be the same as previously described in connection with the embodiment of Fig. 3.

The chuck $30^2$ may be formed with thread 70 by die cutting or molding or may be self-tapping, this thread being cut by screwing the chuck into the threaded section 71 of the hollow shaft $17^2$. The outer and inner layers 72 and 73 of the wall of the resilient chuck $30^2$ may be of different physical characteristics, to the extent found necessary or desirable in the particular application, the outer layer 72 having sufficient rigidity as to permit the cutting of the thread 70 and the inner layer 73 having sufficient resilience to permit gripping the drill shank 31 with allowance for slight manufacturing tolerances on the dimensions of the parts involved. Obviously where the variation of dimensions and degree of resiliency of mounting involved are not large, the element $30^2$ may be homogeneous. In other cases, it may be formed of layers of different materials 72, 73 (as, for example, metal and rubber) suitably bonded together or by suitably treating the outer layer 72 of a tube having a homogeneous wall, so as to modify its properties and impart the necessary rigidity for holding a thread. The thread 70, 71 is preferably of the same hand as the drill so that the drilling action tends to screw the chuck into the hollow shaft $17^2$.

Figure 11:
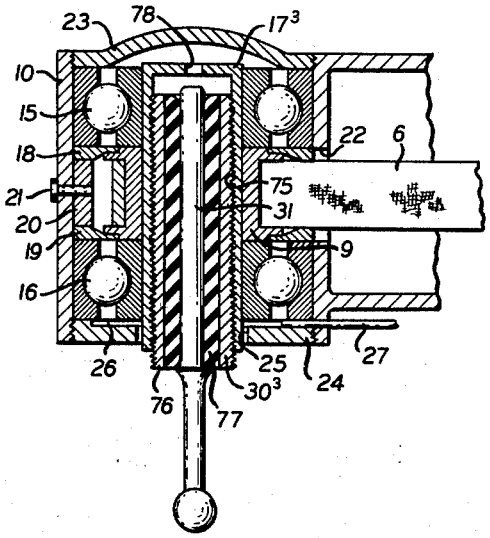
Fig. 11 is a view similar to Fig. 10, showing another modification.

In Fig. 11, there is illustrated a further modification, generally similar to the construction just discussed. In this modification, the tubular shaft $17^3$ has a threaded central bore 75 taking a pre-threaded or self-tapping chuck element $30^3$, which, as before, may be formed of inner and outer layers 76, 77 of different durometer or resiliency. In this case, the shaft $17^3$ is also formed with an end opening 78 permitting egress of air during insertion of the drill and also affording access by means of a pin or similar tool for pushing out the drill, which may be desirable as an alternative to the method shown in Fig. 9, or may be required in the event of damage to the parts. The threading of stubstantially the entire length of the resilient chuck as shown in Fig. 11 may be convenient for manufacturing reasons but is not necessary for holding purposes and the major part of the chuck may be left unthreaded, the threaded section located in any convenient position within the bore of the shaft $17^3$.

Figure 12:
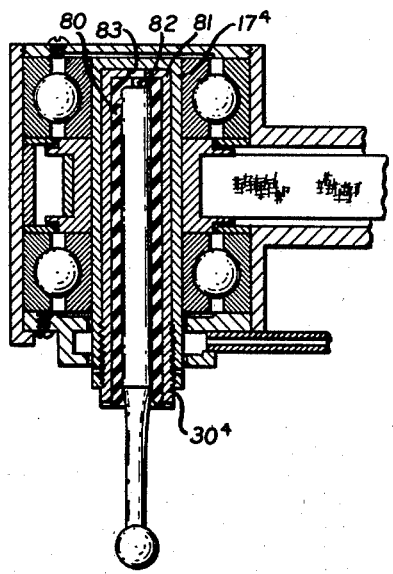
Fig. 12 is a view similar to Fig. 10, showing a modified form of arrangement.

Fig. 12 shows a modification applying a modified form of chuck as used with a different form of drilling head which is described in detail in my previous application Serial No. 534,037, noted above. In this case, the hollow shaft $17^4$ takes a resilient chuck element $30^4$ essentially similar to that disclosed in the embodiment of Fig. 10. In this case, however, the inner layer 80 and outer layer 81, forming the resilient chuck, are cap-shaped and generally closed at their inner ends as shown in the figure apart from openings 82, 83 which may be left for venting of air or for permitting access to parts in assembly or disassembly.

Figure 13:
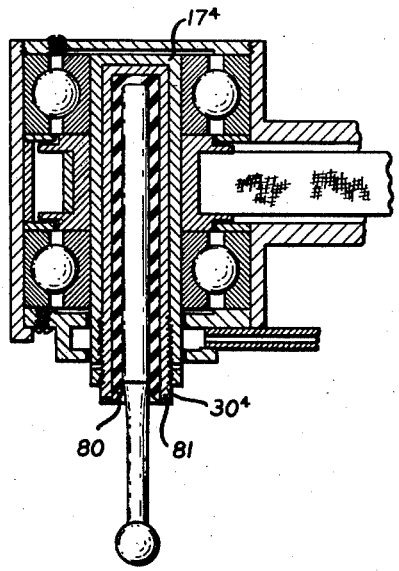
Fig. 13 is a view similar to Fig. 12, showing another modification.

Fig. 13 shows a structure similar to Fig. 12 except that the openings 82, 83 are omitted, thus sealing off the inner end of the chuck opening. In the structure of Figs. 12 and 13, the burr shank may seat against the blind end of the chuck, as indicated in the figures.

What is claimed is:

1. A dental drilling instrument comprising a casing structure, a hollow shaft rotatably supported therein, means for rotating the said hollow shaft, a resilient lining for the hollow shaft and a burr having its shant fitting in and frictionally held by the said resilient lining, in which the said resilient lining is contained in and held by an additional sleeve element which in turn fits in and is held by the said hollow shaft, and in which the said additional sleeve element has a substantially smooth inner surface bonded to the resilient lining and a threaded outer surface, and the said hollow shaft has internal threading engaging in the said threaded outer surface.

2. A dental drilling instrument comprising a casing structure, spaced anti-friction bearings supported in the casing structure, a hollow shaft rotatably supported by the said bearings, means between the bearings for rotating the said shaft, the said shaft having a fixed axial bore extending from one end thereof and from bearing to bearing, a resilient lining fitting the said axial bore and a burr having its shank fitting in and frictionally held by the said resilient lining, in which the said shaft is enclosed in the casing except for one end, which end is substantially flush with the outside of the casing, and in which the casing has a bore fitting with clearance around the said substantially flush end of the shaft, and an air space inwardly of the said bore for maintaining air under pressure to provide a flow of air through the said clearance around the shaft.

3. A dental drilling contra angle instrument comprising an elongated handle, a casing at the end of said handle, a hollow shaft rotatably supported in the said casing at an angle to the handle generally and having an axial bore open at one end for chucking a burr, means carried by the shaft within the casing for rotating the same and anti-friction bearings rotatably supporting the said shaft in the said casing and fixing it in position axially in the casing, the said casing having an opening affording access to the said axial bore and forming a closure around the shaft adjacent the said opening, a resilient lining fitting the said axial bore and insertable and removable through the said opening, means for holding the said lining against axial movement inwardly of the shaft, and a burr having its shank fitting in and frictionally held by the said resilient lining inwardly of the said opening, and the lining being compressed against the wall of the said bore for chucking the burr, whereby the burr is frictionally held for chucking the same and is removable and replaceable by axial sliding movement with respect to said resilient lining, and in which the said opening in the casing has a clearance around the shaft and in which the casing comprises an air space inwardly of the said opening for maintaining air under pressure to provide a flow of air through the said clearance.

References Cited in the file of this patent

UNITED STATES PATENTS

| 2,180,993 | Monnier | Nov. 21, 1939 |
| 2,606,366 | Stevens | Aug. 12, 1952 |
| 2,611,960 | Herndon | Sept. 30, 1952 |
| 2,716,982 | Ryan | Sept. 6, 1955 |
| 2,833,548 | Clark | May 6, 1958 |

FOREIGN PATENTS

| 842,241 | Germany | June 26, 1952 |